United States Patent
Tsuchino

(10) Patent No.: US 10,843,747 B2
(45) Date of Patent: Nov. 24, 2020

(54) FLOW STRAIGHTENER OF VEHICLE

(71) Applicant: Daimler AG, Stuttgart (DE)

(72) Inventor: Ken Tsuchino, Kawasaki (JP)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/096,625

(22) PCT Filed: Mar. 7, 2017

(86) PCT No.: PCT/JP2017/008934
§ 371 (c)(1),
(2) Date: Oct. 25, 2018

(87) PCT Pub. No.: WO2017/187797
PCT Pub. Date: Nov. 2, 2017

(65) Prior Publication Data
US 2019/0152540 A1 May 23, 2019

(30) Foreign Application Priority Data

Apr. 28, 2016 (JP) ................................. 2016-091375

(51) Int. Cl.
*B62D 35/00* (2006.01)
*B60R 19/48* (2006.01)

(52) U.S. Cl.
CPC ............ *B62D 35/001* (2013.01); *B60R 19/48* (2013.01); *B62D 35/00* (2013.01); *B60R 2019/486* (2013.01)

(58) Field of Classification Search
CPC ...... B62D 35/001; B62D 35/00; B62D 37/02; B60R 19/48; B60R 2019/486
(Continued)

(56) References Cited

U.S. PATENT DOCUMENTS

| | | | |
|---|---|---|---|
| 5,555,594 A | * | 9/1996 | Maddalena ........... B60B 39/026 15/313 |
| 2016/0016617 A1 | * | 1/2016 | Wolf ..................... B62D 37/02 296/208 |

(Continued)

FOREIGN PATENT DOCUMENTS

| CN | 204775553 U | 11/2015 |
|---|---|---|
| EP | 2 944 552 A1 | 11/2015 |

(Continued)

OTHER PUBLICATIONS

PCT/JP2017/008934, International Search Report dated Apr. 4, 2017 (Two (2) pages).

(Continued)

*Primary Examiner* — Jason S Morrow
(74) *Attorney, Agent, or Firm* — Crowell & Moring LLP

(57) ABSTRACT

A flow straightener of a vehicle provided with a bumper and a cab disposed above the bumper includes a first opening section provided in the bumper and/or the cab and opened toward a front of the vehicle, and a second opening section connected to the first opening section via a connecting path and opened toward an outer side in a vehicle width direction from a location further on an inner side in the vehicle width direction than front wheels of the vehicle such that traveling wind led into the first opening section passes through a front wheel forward region defined as being behind the first opening section in a lower region of the cab and in front of the front wheels.

7 Claims, 5 Drawing Sheets

(58) Field of Classification Search
USPC .............................. 296/181.5, 180.2, 180.1
See application file for complete search history.

(56) References Cited

U.S. PATENT DOCUMENTS

| | | | |
|---|---|---|---|
| 2017/0136872 A1* | 5/2017 | Ribaldone | B60K 11/085 |
| 2017/0297521 A1* | 10/2017 | Sugie | G01S 7/4813 |
| 2017/0355333 A1* | 12/2017 | Kishima | B60R 19/48 |
| 2018/0148108 A1* | 5/2018 | Del Gaizo | B62D 35/00 |
| 2018/0162458 A1* | 6/2018 | McMillan | B62D 35/02 |

FOREIGN PATENT DOCUMENTS

| | | |
|---|---|---|
| FR | 2 912 984 A1 | 8/2008 |
| JP | 57-158543 U | 10/1982 |
| JP | 8-216937 A | 8/1996 |
| JP | 2004-336602 A | 12/2004 |
| JP | 2006-306226 A | 11/2006 |
| WO | WO 2016/020415 A1 | 2/2016 |

OTHER PUBLICATIONS

Microfilm of the specification and drawings annexed to the request of Japanese Utility Model Application No. 107296/1981 (Laid-open No. 31282/1982) (Nissan Diesel Motor Co., Ltd.), Feb. 18, 1982, fig. 2 to 8 (Four (4) total pages).

Chinese Office Action issued in Chinese application No. 201780016377.8 dated May 8, 2020, with partial English translation (Nine (9) pages).

* cited by examiner

FLOW STRAIGHTENER OF VEHICLE

TECHNICAL FIELD

The present invention relates to a flow straightener of a vehicle for reducing traveling resistance caused by air pressure received by the vehicle from the front.

BACKGROUND ART

A vehicle receives traveling wind from the front during traveling. Such traveling wind acts on the vehicle as traveling resistance and affects fuel consumption performance and traveling stability. In particular, in a commercial vehicle such as a truck in which a tire size is large and an interval between a front bumper and a traveling road surface is relatively large, it is known that traveling resistance is increased by air pressure (an air flow) received by front wheels from the front during traveling.

In reducing such traveling resistance, it is effective to set a flow straightening member such as a bumper skirt so as to suppress an air inflow into a vehicle lower part. However, the fixed setting of the flow straightening member causes likelihood that a vehicle body interferes with a traveling road surface because of a decrease in an approach angle. In order to solve these problems, PTL 1, for example, discloses a technique for enabling a reduction in traveling resistance while avoiding interference between a vehicle body and a traveling road surface by adopting a flow straightening member retractable on the vehicle body side according to a traveling state of a vehicle.

CITATION LIST

Patent Literature

[PTL 1] Japanese Patent Application Laid-open No. H8-216937

SUMMARY OF INVENTION

Problems to be Solved by the Invention

However, in PTL 1 described above, since the flow straightening member is a movable type, a driving mechanism such as an actuator is necessary. Therefore, an increase in manufacturing costs and an increase in vehicle weight are unavoidable.

At least one embodiment of the present invention has been devised in view of the circumstances and an object of the present invention is to provide a flow straightener of a vehicle capable of reducing traveling resistance with simple structure while avoiding interference between a vehicle body and a traveling road surface.

Means for Solving the Problems (1) In order to solve the problems, a flow straightener of a vehicle according to at least one embodiment of the present invention is a flow straightener of a vehicle provided with a bumper and a cab provided above the bumper, the flow straightener of the vehicle including: a first opening section provided in the bumper and/or the cab and opened toward the front of the vehicle; and a second opening section connected to the first opening section via a connecting path and opened toward the outer side in the vehicle width direction from a location further on an inner side in the vehicle width direction than front wheels of the vehicle such that traveling wind led into the first opening section passes through a front wheel forward region defined as being behind the first opening section in a lower region of the cab and in front of the front wheels.

According to the configuration of (1) described above, a part of the traveling wind received from the front by the vehicle during traveling is taken in by the first opening section. The traveling wind taken into the first opening section is led to the second opening section through the connecting path. The second opening section is opened toward the outer side in the vehicle width direction further on the inner side in the vehicle width direction than the front wheels. The traveling wind blown out from the second opening section flows to pass through the front wheel forward region defined as being behind the first opening section and in front of the front wheels of the vehicle in the lower region of the cab. Consequently, an air curtain is formed to at least partially cover the front wheel forward region by the traveling wind blown out from the second opening section. The traveling wind received by the front wheels from the vehicle front is led to the vehicle outer side before reaching the front wheels. As a result, the traveling wind received by the front wheels from the front is blocked. A reduction in traveling resistance is achieved. Such a flow straightener does not narrow an interval between a vehicle body lower surface and a traveling road surface. Therefore, likelihood of interference of a vehicle body with the traveling road surface is not increased. Since the flow straightener does not need to have a driving mechanism such as an actuator, it is possible to reduce the traveling resistance with simple structure.

(2) In several embodiments, in the configuration of (1) described above, the second opening section is opened such that the traveling wind blown out from the second opening section passes through the front wheel forward region without interfering with the front wheels.

According to the configuration of (2) described above, since the traveling wind from the second opening section passes through the front wheel forward region without interfering with the front wheels, it is possible to form the air curtain with a stable air stream.

(3) In several embodiments, in the configuration of (1) or (2) described above, the connecting path is a hollow member connected to the bumper and/or the cab and configured to enable the traveling wind to pass through the inside of the hollow member.

According to the configuration of (3) described above, the connecting path that connects the first opening section and the second opening section is formed by the hollow member such as a duct. Therefore, the traveling wind taken in from the first opening section is led to the second opening section along the inside of the hollow member. In order to construct an air guide route for obtaining the action, such a hollow member is easily laid on the inside of the vehicle body such that the second opening section is located in an appropriate position. It is possible to realize the configuration in an efficient layout.

(4) In several embodiments, in the configuration of (3) described above, the connecting path is formed to decrease in a sectional area as the connecting path is closer to the second opening section from the first opening section.

According to the configuration of (4) described above, when the traveling wind passing through the connecting path passes through the hollow member gradually decreasing in the cross section, flow velocity of the traveling wind is increased by a so-called Venturi effect. The traveling wind taken in from the first opening section in this way is blown out from the second opening section in a state in which the flow velocity is increased. Therefore, it is possible to more stably form the air curtain.

(5) In several embodiments, in the configuration of (1) or (2) described above, the connecting path is formed integrally with the bumper and/or the cab.

According to the configuration of (5) described above, since the connecting path is formed integrally with the bumper and/or the cab, it is possible to realize the flow straightener with a smaller number of constituent members.

(6) In several embodiments, in the configuration of (5) described above, the second opening section has an opening diameter smaller than the first opening section.

According to the configuration of (6) above, the opening diameter of the second opening section on an outlet side of the connecting path is smaller than the first opening section on an inlet side. Therefore, the flow velocity of the traveling wind passing through the connecting path is increased by a so-called Venturi effect. In this way, the traveling wind taken in from the first opening section is blown out from the second opening section in a state in which the flow velocity is increased. Consequently, it is possible to more stably form the air curtain.

(7) In several embodiments, in any one of the configurations of (1) to (6) described above, the second opening section is covered by the bumper and/or the cab when viewed from the front of the vehicle.

According to the configuration of (7) described above, since the second opening section is not exposed to the traveling wind from the vehicle front, the second opening section itself does not cause the traveling resistance. Therefore, it is possible to more effectively reduce the traveling resistance.

Effect of the Invention

According to at least one embodiment of the present invention, it is possible to provide a flow straightener of a vehicle capable of reducing traveling resistance with simple structure while avoiding interference between a vehicle body and a traveling road surface.

MODES FOR CARRYING OUT THE INVENTION

Figure 1:
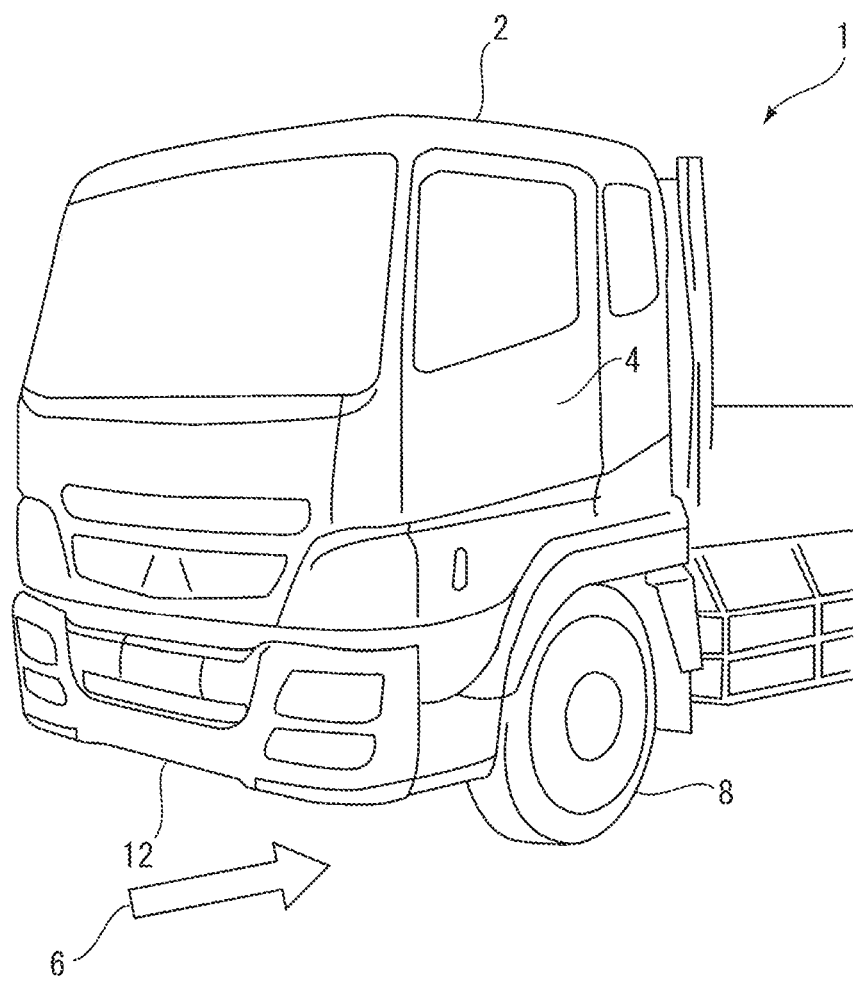
FIG. 1 is a perspective view showing a basic configuration of a vehicle 1 provided with a flow straightener according to at least one embodiment of the present invention.

Several embodiments of the present invention are explained below with reference to the accompanying drawings. However, dimensions, materials, shapes, relative disposition, and the like of components described as the embodiments or shown in the drawings are not meant to limit the scope of the present invention to the dimensions, the materials, the shapes, and the relative disposition and are only mere explanation examples.

An expression representing relative or absolute disposition such as "in a certain direction", "along a certain direction", "parallel", "orthogonal", "center", "concentric", or "coaxial" not only strictly represents such disposition but also represents a state in which the components are relatively displaced with a tolerance or an angle or a distance in a degree in which the same function is obtained.

An expression representing a shape such as a square shape or a cylindrical shape not only represents a shape such as a square shape or a cylindrical shape in a geometrically strict sense but also represents a shape including an uneven portion, a chamfered portion, or the like in a range in which the same effect is obtained.

On the other hand, an expression "provided with", "equipped with", "furnished with", "including", or "having" one constituent element is not an exclusive expression for excluding the presence of other constituent elements.

FIG. 1 is a perspective view showing a basic configuration of a vehicle 1 provided with a flow straightener according to at least one embodiment of the present invention.

The vehicle 1 is a truck vehicle in which a cab 2 and the like are disposed on a chassis (not shown in the figure) mounted with a power train including a power source such as an internal combustion engine. The cab 2 is mounted on the chassis via a cab suspension (not shown in the figure). The cab 2 is provided with, on both sides in the vehicle width direction of the cab 2, side doors 4 that can be opened and closed when an occupant gets on and off the vehicle 1. In a front lower part of the cab 2, a bumper member 12 having a longitudinal shape along the vehicle width direction is disposed on the chassis side.

The bumper member 12 is an exterior member provided with a buffer function. Besides a metal material such as iron or aluminum and a resin material such as polypropylene, various materials such as FRP and carbon fiber are used. Note that the surface of the bumper member 12 is processed by plating, painting, or the like.

The traveling wind received by the vehicle 1 from the front acts as traveling resistance on the vehicle 1. In the truck vehicle in this embodiment, as shown in FIG. 1, an interval between a vehicle body lower surface and a traveling road surface is relatively large and a tire size is also large. Therefore, a part of the traveling wind received from the front is led to enter a lower part of the vehicle body. Such a part of the traveling wind reaches front wheels 8 to contribute to an increase in the traveling resistance of the vehicle 1. The traveling wind that can reach the front wheels 8 in this way is straightened by the flow straightener explained below. Consequently, it is possible to achieve a reduction in the traveling resistance.

Figure 2:
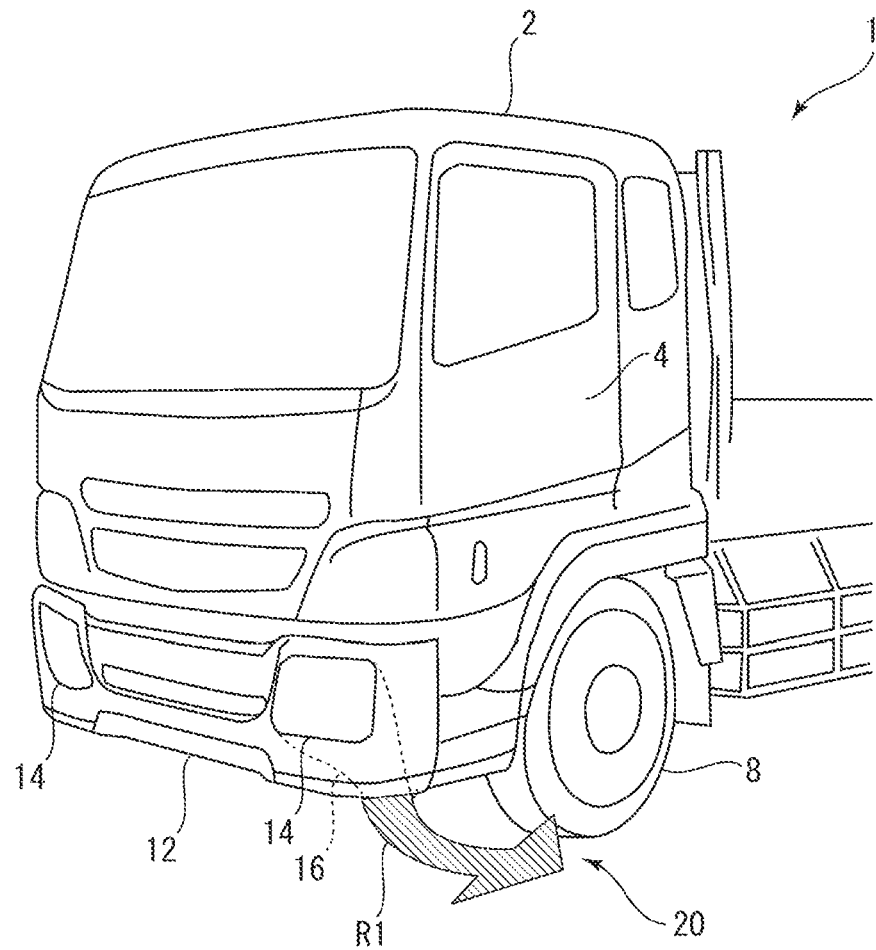
FIG. 2 is a schematic diagram showing, in perspective, a flow path of traveling wind formed by the flow straightener according to a first embodiment together with an exterior of a vehicle.
Figure 3:
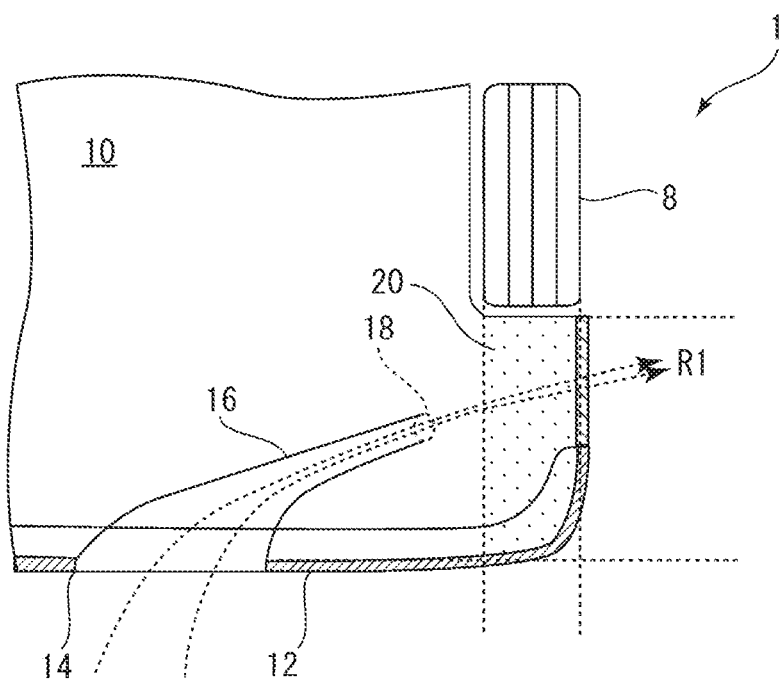
FIG. 3 is a horizontal sectional view passing a connecting path shown in FIG. 2.

Subsequently, the structure of a flow straightener according to a first embodiment is explained in detail with reference to FIG. 2 and FIG. 3. FIG. 2 is a schematic diagram showing, in perspective, a flow path R1 of traveling wind formed by the flow straightener according to the first embodiment together with an exterior of the vehicle 1. FIG. 3 is a horizontal sectional view passing a connecting path 16 shown in FIG. 2.

As shown in FIG. 2, first opening sections 14 opened toward the front are provided in the bumper member 12 of the vehicle 1. The first opening sections 14 are opened to pierce through a tabular member configuring the bumper member 12 and configured such that traveling wind received from the front during traveling is taken in. In this example, two first opening sections 14 are symmetrically provided in the front surface of the bumper member 12. In the following explanation, one of the two first opening sections 14 is explained in detail. However, unless specifically described otherwise, both of the first opening sections 14 are treated as having an equivalent configuration.

In the bumper member 12, the connecting path 16 is provided to be connected to the first opening section 14 from the inner side. In this embodiment, in particular, the connecting path 16 is configured as a hollow member configured to enable the traveling wind taken in from the first opening section 14 to pass through the inner side (e.g., the connecting path 16 is a duct at least partially having a closed cross section). In order to construct an air guide route for obtaining flow straightening action, such a hollow member is easily laid on the inside of a vehicle body such that a second opening section 18 is located in an appropriate position. It is possible to realize the flow straightener in an efficient layout.

The connecting path 16 is formed to have a largest sectional area on the first opening section 14 side and gradually narrow toward the inner side of the connecting path 16. By securing the first opening section 14 wide in this way, it is possible to efficiently take in the traveling wind received from the front surface of the vehicle 1. Since the sectional area of the connecting path 16 gradually decreases, it is possible to improve, through so-called Venturi effect, flow velocity of the traveling wind taken in from the first opening section 14. Consequently, an air curtain is stably formed by the traveling wind blown out from the second opening section 18 as explained below.

Note that, as a size of the first opening section 14 is larger, more traveling wind can be taken in. On the other hand, the size of the first opening section 14 contributes to an increase in the traveling resistance. Therefore, the size of the first opening section 14 is desirably determined taking into account a balance of the traveling wind and the traveling resistance.

The traveling wind taken in from the first opening section 14 during traveling is led to the second opening section 18 provided in a vehicle body lower surface 10 via the connecting path 16 (this means that the connecting path 16 is formed to cause the first opening section 14 and the second opening section 18 to communicate).

Note that, in FIG. 3, to clarify explanation, the vehicle body lower surface 10 is shown as a plane. However, it goes without saying that, since an actual vehicle 1 has various shapes depending on models, the vehicle body lower surface 10 is not limited to a plane shape. In other words, a peripheral structure is not limited as long as, for example, the traveling wind blown out from the second opening section 18 is formed such that flow straightening action explained below is obtained.

The second opening section 18 is opened in the vehicle body lower surface 10 and configured to blow out the traveling wind led by the connecting path 16 to a lower region of the cab 2 (i.e., a space between the vehicle 1 and the traveling road surface). In particular, the second opening section 18 is opened such that the traveling wind blown out from the second opening section 18 passes from the inner side toward the outer side in the vehicle width direction in a front wheel forward region 20 as indicated by the flow path R1. The front wheel forward region 20 is a region defined as being behind the first opening section 14 in the lower region of the cab 2 and in front of the front wheels 8 of the vehicle 1 (as shown in FIG. 3, see a region indicated by hatching shown between the first opening section 14 and the front wheels 8).

The traveling wind blown out from the second opening section 18 forms the flow path R1. Therefore, traveling wind 6 received by the front wheels 8 from the front during traveling is blocked by the traveling wind blowing out from the second opening section 18. That is, the traveling wind 6 received by the front wheels 8 from the front is blocked by the air curtain formed by the traveling wind blowing out from the second opening section 18.

Note that the traveling wind from the second opening section 18 is designed to be out without interfering with the front wheels 8. Therefore, the air curtain is formed by a stable air stream.

When the traveling wind from the second opening section 18 is blow against the traveling road surface strongly, an air stream rebounding from the traveling road surface toward the vehicle body side is sometimes generated. Such an air stream can also be a factor of an increase in the traveling resistance. Therefore, an opening direction of the second opening section 18 and the strength of the traveling wind blown out from the second opening section 18 may be designed such that the air stream received from the traveling road surface is not received by the front wheels 8. For example, a position where the flow path R1 comes into contact with the traveling road surface may be designed to be further on the outer side in the vehicle width direction than the front wheels 8 such that, even if an air stream flowing from the traveling road surface to the vehicle body side is generated, the air stream does not contribute to an increase in the traveling resistance.

Note that the flow path R1 shown in FIG. 3 schematically shows a flow path of the traveling wind blown out from the second opening section 18 in the vehicle 1 that travels at predetermined speed. The predetermined speed may be optional. However, the predetermined speed is desirably set on the basis of a speed region assumed to have a high frequency in the vehicle 1. For example, in a large truck having a high opportunity of traveling at constant speed in an expressway, the predetermined speed is set to correspond to assumed cruising speed.

The second opening section 18 is provided to be covered by the bumper 12 disposed in the front when viewed from the front of the vehicle 1. Consequently, the second opening section 18 is not exposed to the traveling, wind 6 from the vehicle front. The second opening section 18 itself does not contribute to an increase in the traveling resistance.

Note that, in the explanation in the embodiment, the first opening section 14 is provided in the bumper member 12. However, the first opening section 14 may be provided in the cab 2. In a typical truck vehicle, the cab 2 is provided on a chassis via a cab suspension. Therefore, a relative positional relation between the cab 2 and the chassis side fluctuates during traveling. Therefore, when the first opening section 14 is provided on the cab 2 side, it is desirable to flexibly configure the connecting path 16 to absorb displacement between the cab 2 and the chassis side that occurs during traveling.

As explained above, according to this embodiment, a part of the traveling wind received by the vehicle 1 from the front during traveling is taken in by the first opening section 14. The traveling wind taken into the first opening section 14 is led to the second opening section 18 through the connecting path 16. The second opening section 18 is opened toward the outer side in the vehicle width direction further on the inner side in the vehicle width direction than the front wheels 8. The traveling wind blown out from the second opening section 18 flows to pass through the front wheel forward region 20 defined as being behind the first opening section 14 in the lower region of the cab 2 and in front of the front wheels 8 of the vehicle 1. Consequently, the air curtain is formed to at least partially cover the front wheel forward region 20 by the traveling wind blown out from the second opening section 18. The traveling wind received by the front wheels 8 from the vehicle front is led to the vehicle outer side before reaching the front wheels 8. As a result, the traveling wind received by the front wheels 8 from the front is blocked. A reduction in the traveling resistance is achieved. Such a flow straightener does not narrow an interval between the vehicle body lower surface and the traveling road surface. Therefore, likelihood of interference of the vehicle body with the traveling road surface is not increased. Since the flow straightener does not need to have a driving mechanism such as an actuator, it is possible to reduce the traveling resistance with simple structure.

Second Embodiment

Figure 4:
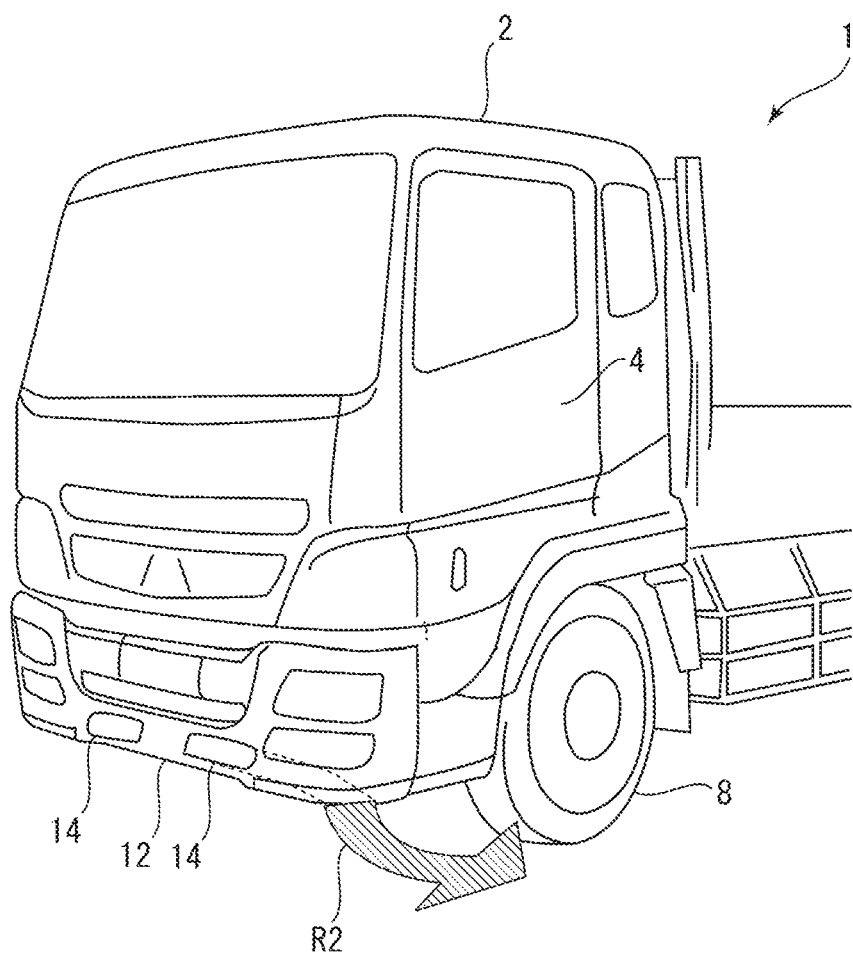
FIG. 4 is a schematic diagram showing, in perspective, a flow path of traveling wind by a flow straightener according to a second embodiment together with an exterior of a vehicle.
Figure 5:
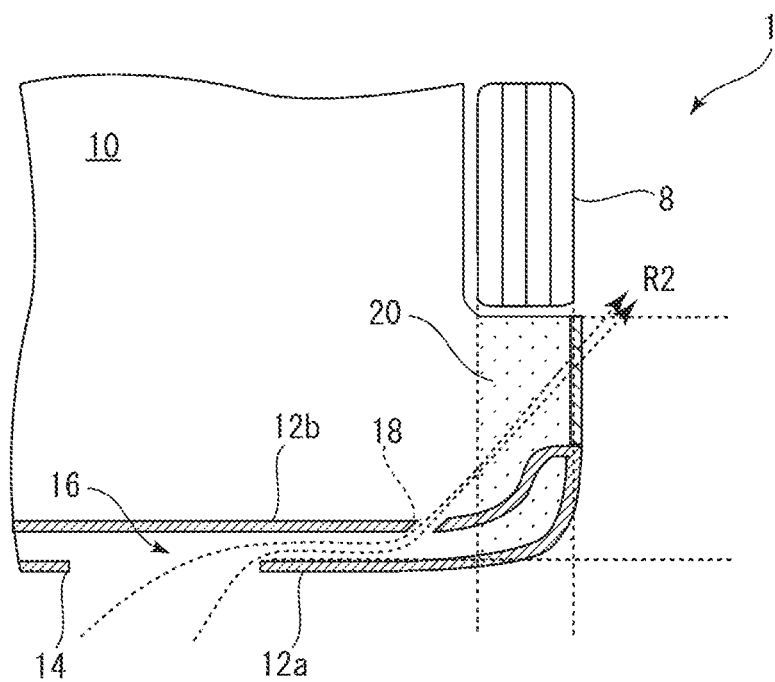
FIG. 5 is a horizontal sectional view passing a connecting path shown in FIG. 4.

Subsequently, a flow straightener according to a second embodiment is explained with reference to FIG. 4 and FIG. 5. FIG. 4 is a schematic diagram showing, in perspective, a flow path R2 of traveling wind by the flow straightener according to the second embodiment together with an exterior of the vehicle 1. FIG. 5 is a horizontal sectional view passing the connecting path 16 shown in FIG. 4.

Note that, in the following explanation, components corresponding to the components in the embodiment explained above are denoted by common reference numerals and signs. Redundant explanation is omitted as appropriate.

In this embodiment, the bumper member 12 has a hollow shape including an outer side member 12a and an inner side member 12b. In this embodiment, in particular, the bumper member 12 is made of a resin material. The outer side member 12a and the inner side member 12b are integrally formed. In the outer side member 12a of the bumper member 12, the first opening section 14 is provided to be opened toward the vehicle front. The first opening section 14 is provided in a pair symmetrically below the bumper member to be capable of taking in the traveling wind near the traveling road surface.

On the other hand, the second opening section 18 is provided in the inner side member 12b of the bumper member 12. The inner side member 12b configures a part of the vehicle body lower surface 10. As in the first embodiment, the inner side member 12b is configured to blow out the traveling wind led by the connecting path 16 to the lower region of the cab 2 (i.e., the space between the vehicle 1 and the traveling road surface). In this embodiment, in particular, the connecting path 16 is configured as a hollow space of the bumper member located between the first opening section 14 and the second opening section 18. Consequently, the traveling wind taken in from the first opening section 14 is blown out from the second opening section 18 via the hollow space of the bumper member 12, which is the connecting path 16.

As indicated by the flow path R2, the traveling wind blown out from the second opening section 18 passes through the front wheel forward region 20 from the inner side toward the outer side in the vehicle width direction to thereby form an air curtain and blocks the traveling wind 6 received by the front wheels 8 from the front during traveling. The traveling wind 6 received by the front wheels 8 from the front is blocked by the air curtain formed by the traveling wind blowing from the second opening section 18 in this way. In this case, the traveling wind from the second opening section 18 is designed to be blown out without interfering with the front wheels 8. Therefore, it is possible to form the air curtain with a stable air stream.

In this embodiment, as explained above, the first opening section 14, the second opening section 18, and the connecting path 16 are integrally configured as the bumper member 12. Therefore, it is possible to realize the flow straightener with a small number of constituent members. In particular, in this embodiment, the second opening section 18 has an opening diameter smaller than the first opening section 14. In this way, the opening diameter of the second opening section 18 on an outlet side of the connecting path 16 is smaller than the first opening section 14 on an inlet side. Therefore, the flow velocity of the traveling wind passing through the connecting path 16 is increased by a so-called Venturi effect. In this way, the traveling wind taken in from the first opening section 14 is blown out from the second opening section 18 in a state in which the flow velocity is increased. Consequently, it is possible to more stably form the air curtain.

As explained above, according to at least one embodiment of the present invention, it is possible to realize the flow straightener of the vehicle capable of reducing traveling resistance with simple structure while avoiding interference between the vehicle body and the traveling road surface.

Figure 6:
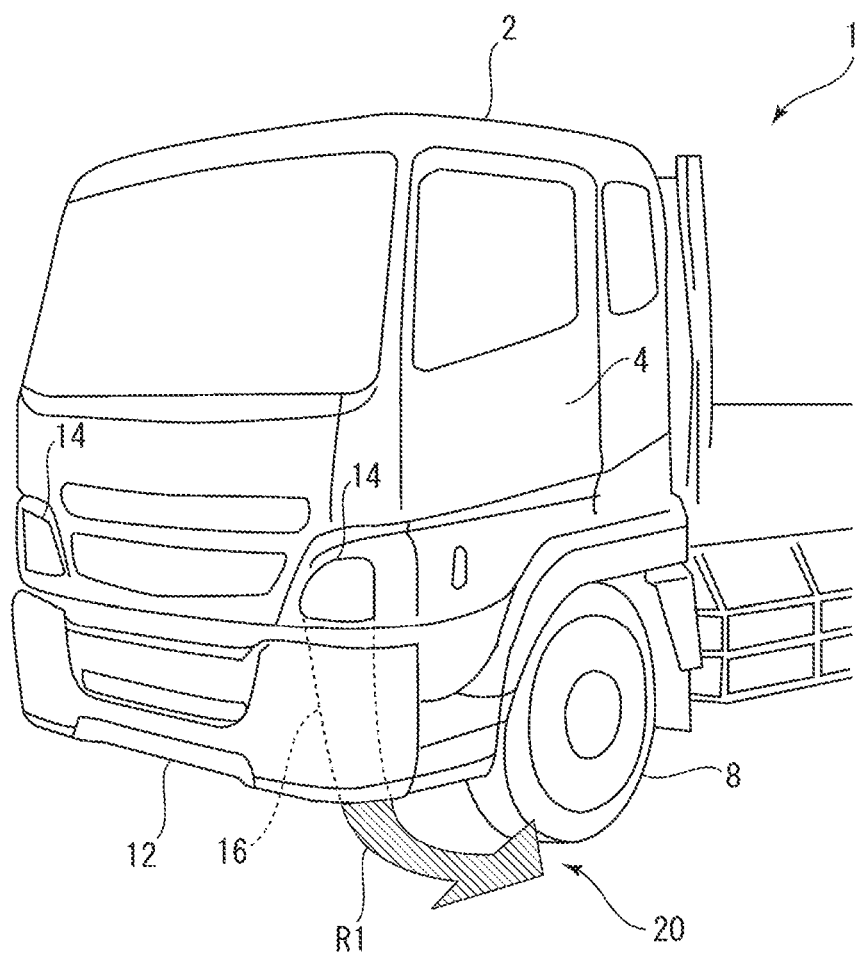
FIG. 6 is a modification of FIG. 2.

Note that, in the illustration in the embodiments, the first opening section 14 is opened in the bumper member 12. However, as shown in FIG. 6, the first opening section 14 may be provided in the cab 2. In this case, the traveling wind taken in from the first opening section 14 provided in the front surface of the cab 2 is blown out from the second opening section 18 through the connecting path 16 that connects the cab 2 and the bumper member 12.

Figure 7:
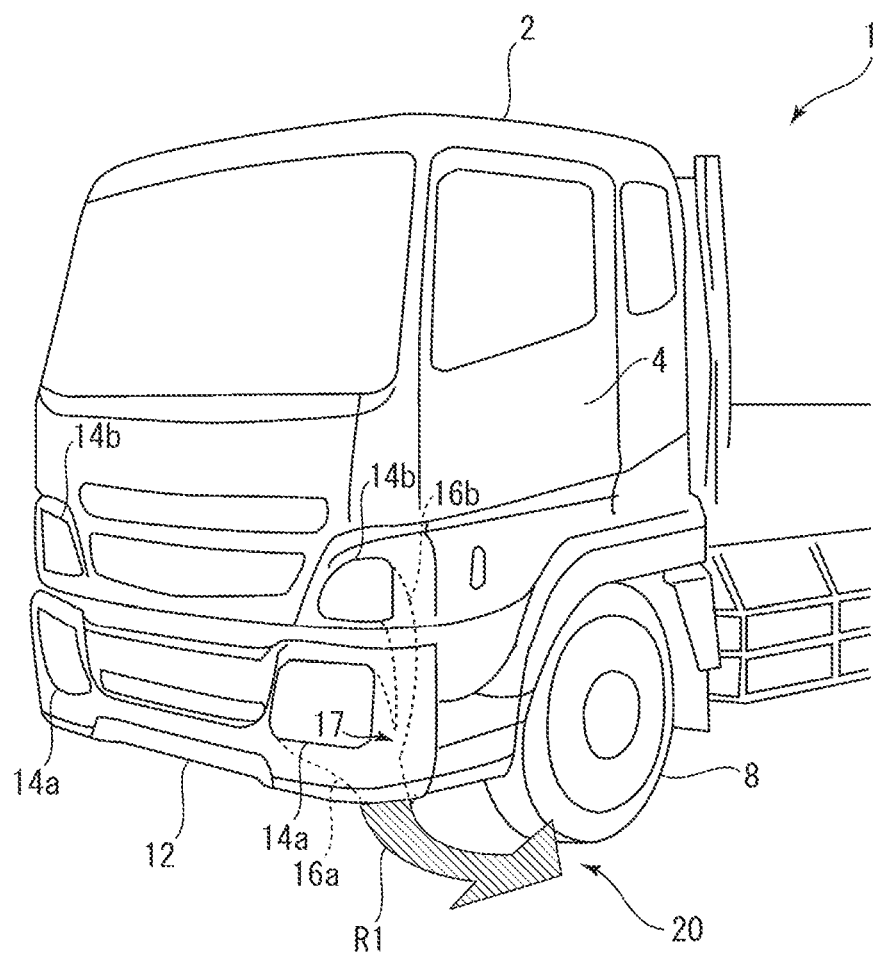
FIG. 7 is another modification of FIG. 2.

As shown in FIG. 7, the first opening sections 14 may be respectively provided in both of the cab 2 and the bumper member 12. In FIG. 7, the first opening sections 14 are provided with first opening sections 14a provided in the cab 2 and second opening sections 14b provided in the bumper member 12 and are configured such that a first connecting path 16a connected to the first opening sections 14a and a second connecting path 16b connected to the second opening sections 14b merge in a merging section 17 present on the vehicle body inner side and a downstream side of the merging section 17 is connected to the second opening section 18. In this case, traveling winds taken in from both of the first opening sections 14a and 14b merge respectively passing through the first connecting path 16a and the second connecting path 16b and are thereafter blown out from the second opening section 18. Such modifications can be considered the same in the second embodiment.

REFERENCE SIGNS LIST

1 Vehicle
2 Cab
4 Side door
6 Traveling wind
8 Front wheel
10 Vehicle body lower surface
12 Bumper member
12a Outer side member
12b Inner side member
14 First opening section
16 Connecting path 18 Second opening section
20 Front wheel forward region

The invention claimed is:

1. A flow straightener of a vehicle provided with a bumper and a cab disposed above the bumper, the flow straightener of the vehicle, comprising:
a first opening section disposed in the bumper and/or the cab and opened toward a front of the vehicle; and
a second opening section connected to the first opening section via a connecting path and opened toward an outer side in a vehicle width direction from a location further on an inner side in the vehicle width direction than front wheels of the vehicle such that traveling wind led into the first opening section passes through a front wheel forward region defined as being behind the first opening section in a lower region of the cab and in front of the front wheels.

2. The flow straightener of the vehicle according to claim 1, wherein the second opening section is opened such that traveling wind blown out from the second opening section passes through the front wheel forward region without interfering with the front wheels.

3. The flow straightener of the vehicle according to claim 1, wherein the connecting path is a hollow member connected to the bumper and/or the cab and is configured to enable the traveling wind to pass through an inside of the hollow member.

4. The flow straightener of the vehicle according to claim 3, wherein the connecting path decreases in a sectional area as the connecting path is closer to the second opening section from the first opening section.

5. The flow straightener of the vehicle according to claim 1, wherein the connecting path is formed integrally with the bumper and/or the cab.

6. The flow straightener of the vehicle according to claim 5, wherein the second opening section has an opening diameter that is smaller than an opening diameter of the first opening section.

7. The flow straightener of the vehicle according to claim 1, wherein the second opening section is covered by the bumper and/or the cab when viewed from the front of the vehicle.

* * * * *